F. S. DICKINSON.
PNEUMATIC TIRE.
APPLICATION FILED SEPT. 1, 1915.
1,234,143.
Patented July 24, 1917.
2 SHEETS—SHEET 2.
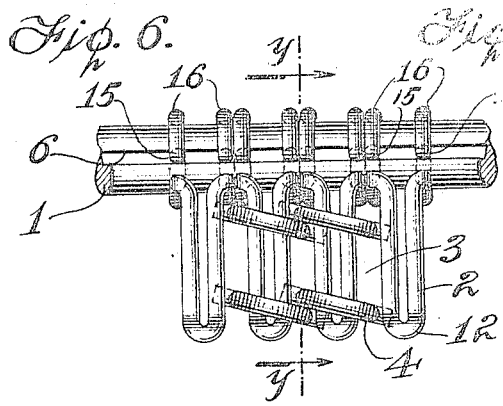
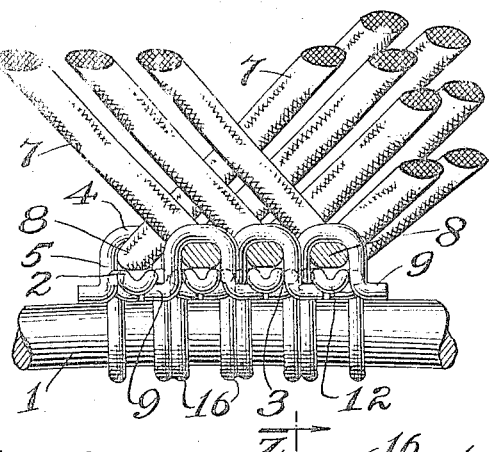
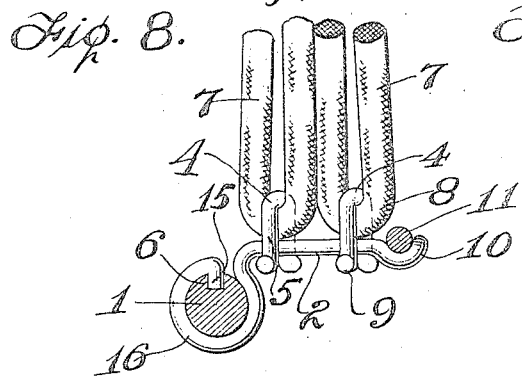
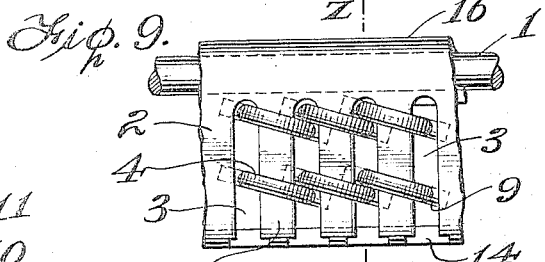
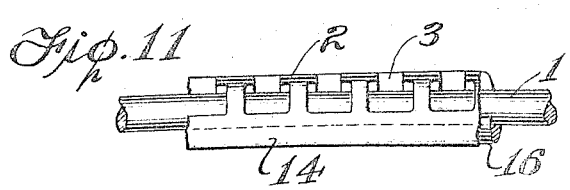
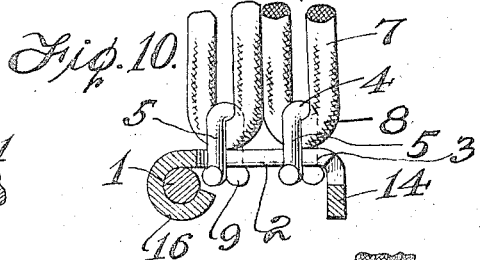
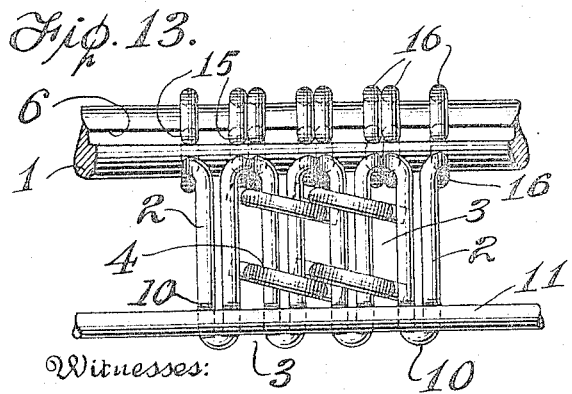
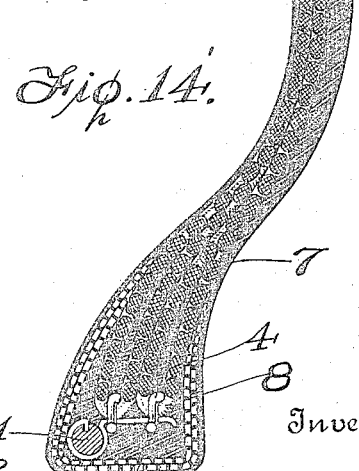
Witnesses:
Wm H Hawkins
Inventor
Fredrick S. Dickinson.
By his Attorney,

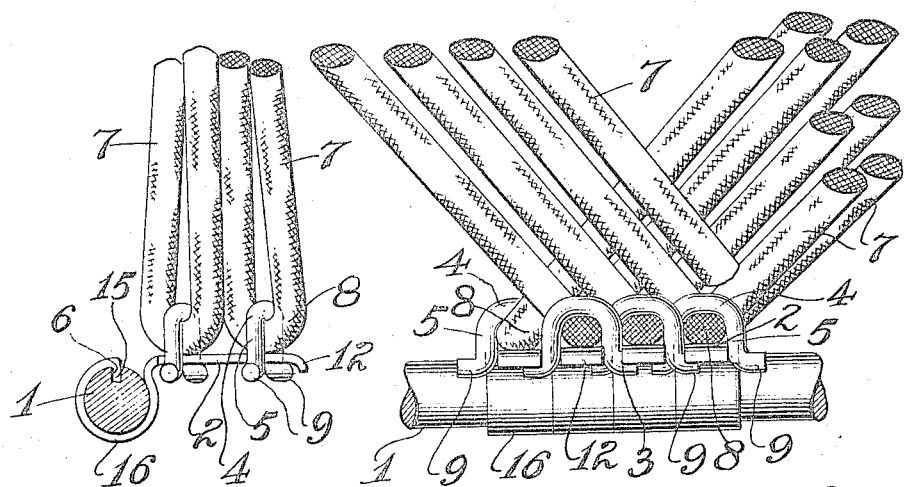
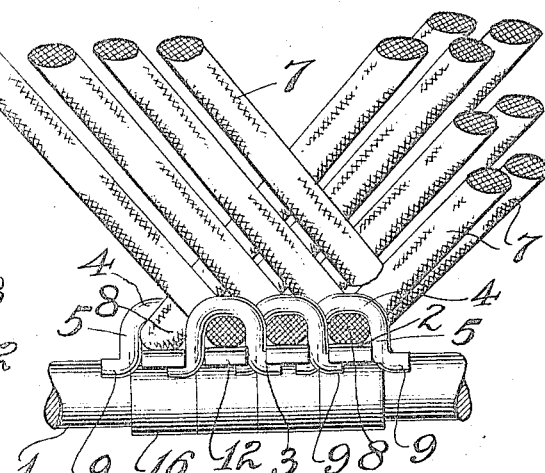
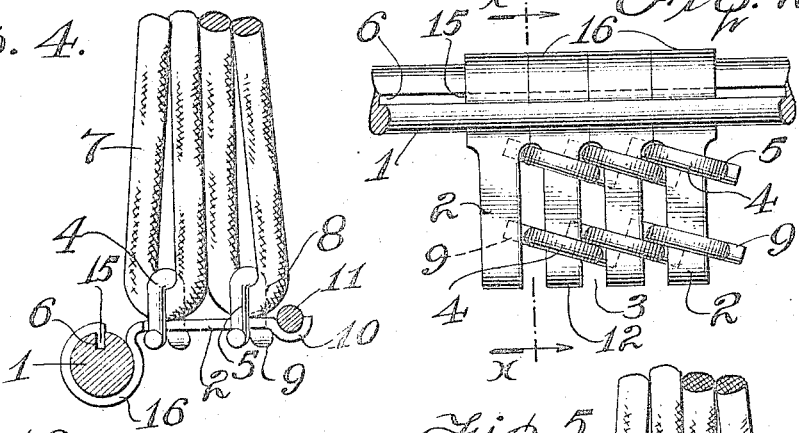
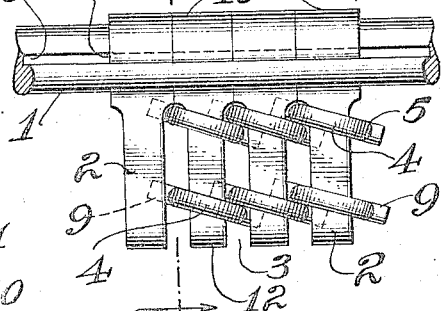
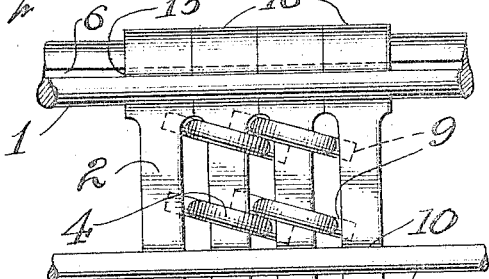
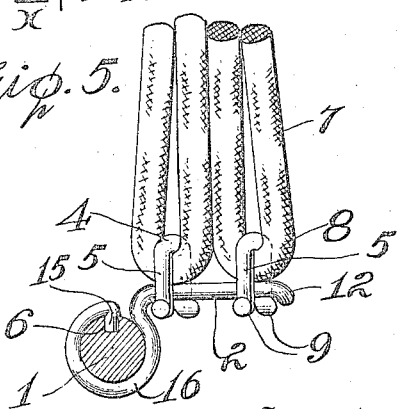

UNITED STATES PATENT OFFICE.

FREDRICK S. DICKINSON, OF NEW YORK, N. Y.

PNEUMATIC TIRE.

1,234,143.      Specification of Letters Patent.      Patented July 24, 1917.

Application filed September 1, 1915. Serial No. 48,400.

*To all whom it may concern:*

Be it known that I, FREDRICK S. DICKINSON, a citizen of the United States, and resident of New York, in the county and State of New York, have invented certain new and useful Improvements in Pneumatic Tires, of which the following is a specification.

This invention relates to pneumatic tires of that class in which the internal body fabric of the shoe or casing is of the "cord" type, and it has particular relation to improved means for anchoring the cord body fabric at the bead or selvage edges thereof.

In the usual construction of cord tires, the length of cord is looped or turned parallel to the annulus of the tire at the bead edge thereof and the portion of the cords extending from said loops are carried over the circumference of the tire at the side and tread portions thereof, and the anchoring of the cords at the bead edge has usually been dependent upon merely the vulcanization by which the cord fabric is amalgamated with the shoe or casing or the turns or loops of the cord parallel to the annulus of the tire at the bead edge have been passed around hooks or staples positioned laterally with relation to the annulus of the tire and embedded in the bead. Such constructions do not maintain the required tension on the cords, owing to the tendency of the latter to assume their natural length, which action ensues by reason of the fact that the first heat of the vulcanizing process softens the rubber compounds sufficiently to permit slippage in the length of the cords. It is therefore desirable that a secure and permanent anchoring means be provided which will effectively and at all times maintain the laid cords at their normal tension.

My invention is particularly adapted for employment in relation to the improved type of cord tire which is shown in my co-pending application Serial No. 10,213, in which the cord body fabric is constituted by a continuous length of cord which is turned or looped at the bead edge at an angle to the annulus of the tire and laid over itself at said turn or loop and spread or diverged therefrom in a gradual and continuous positional relationship in which the under portion of the length of cord gradually emerges from beneath the upper portion and said under and upper portions relatively spread and extend over the space area of the variable circumference of the tire. For an understanding of the general construction of the type of cord tire to which my improved anchoring means are related, reference may be had to the co-pending application above noted.

The object of my invention is to provide a simple and improved anchoring means for the turned or looped length of cord at the bead edge, which can be inexpensively and readily manufactured, which will effectively and securely maintain the cords at all times at normal tension, which will enable the laying and looping of the length of cord and its attachment with relation to the anchoring bead ring in a rapid and economical operation, and which will furthermore possess advantages in point of security, inexpensiveness, effectiveness, and general efficiency.

A further object of my invention is to provide an improved anchoring means whereby the selvage or bead edge of the cord body fabric will be securely held against all liability of release of the tension of the cords during the process of making the tire, during vulcanization or curing, or when in operative use thereafter.

A further object of my invention is to provide an improved anchoring means whereby the replacement of broken cords may be effected without the necessity of tearing or cutting through the original bead and the resultant necessity of rebuilding the bead, and which will enable the laying of any replaced cords under the same tension as was maintained in the original cords, and to these ends my improvements comprise detachable or separable means carried by the bead ring structure, to which detachable means the cords are directly connected, substantially as hereinafter described.

My invention thus comprises a reinforcing bead ring, bars or tangs or fingers carried thereby, and inextensible anchoring means inserted upon said tangs and securing the selvage-edge loops of the cord, said anchoring means thus providing an attachable connection between the cord and the bars or tangs of the bead ring.

In the drawings—

Figure 1 is a detail cross-section of the bead ring and anchoring means, showing the cord loops as anchored to one bar or tang of the ring by means of the eyelets.

Fig. 2 is a detail plan view of a section or segment of the periphery of the bead ring and anchoring means, corresponding to the construction shown in Fig. 1, the anchoring eyelets being shown in position but the cords not being illustrated.

Fig. 3 is a side view of the construction shown in Fig. 2, illustrating also the placement of the cords of two plies as laid at reverse angles.

Fig. 4 is a detail cross-section on the plane of the line $x$—$x$, Fig. 2, illustrating a modified construction in which an outer reinforcing ring is provided at the outer ends of the bars or tangs.

Fig. 5 is a detail cross-section corresponding to the illustration in Fig. 1 and showing a modified construction of the bars or tangs.

Fig. 6 is a detail plan view corresponding to the illustration in Fig. 2 and showing the modified construction as in Fig. 5.

Fig. 7 is a side view of the modified construction shown in Fig. 6, illustrating also the placement of the cords.

Fig. 8 is a detail cross-section on the plane of the line $y$—$y$, Fig. 6, illustrating a modified construction in which an outer reinforcing ring is provided at the outer ends of the bent-wire bars or tangs.

Fig. 9 is a detail plan view corresponding to the illustration in Fig. 2 and illustrating a further modification in the construction of the bars or tangs.

Fig. 10 is a detail cross-section on the line $z$—$z$, Fig. 9.

Fig. 11 is a side view of the construction shown in Fig. 9, the anchoring eyelets not being illustrated.

Fig. 12 is a detail plan view of the modified construction as shown in Fig. 4.

Fig. 13 is a detail plan view of the modified construction as shown in Fig. 8.

Fig. 14 is a detail cross-section of the bead portion of a completed tire with the anchoring means and cord fabric, following the type of construction illustrated in Fig. 1, embedded therein.

Corresponding parts in all the figures are denoted by the same reference characters.

I have herein illustrated my improved anchoring means in its relation to a two-ply cord body fabric, in which the cord lengths of the respective plies are laid at reverse angles and extend obliquely to the transverse or segmental cross-sectional plane of the tire, but it will be understood that the anchoring means is adaptable as well to the employment of a single ply cord fabric or to the employment of any desired plurality of superimposed plies. It will also be understood that in all constructions of the improved anchoring means the bead ring and its bars or tangs and the anchoring eyelets to which the cord loops are connected are all embedded in the bead of the tire and serve the office of a reinforce therefor.

In the practical construction of the cord body fabric, and the anchoring thereof according to my invention, the length of cord is laid over a suitable core or mandrel or former, at an angle thereto, under any desired tension, and turned or looped upon itself at its selvage or bead edges (for instance, in the manner set forth in my copending application above referred to) and with the looped ends resting on the bar or tang or finger of the bead ring herein shown. The anchoring eyelet is then placed over the cord at its loop and over the bar or tang and brought to position to securely anchor the cord at its loop to the bar or tang of the bead ring and thus insure the maintenance of uniform tension in each lay of the cord and throughout its entire length as the cord is laid and the successive eyelets are placed in position. The entire operation of laying and anchoring the cords in the manner just set forth is accomplished by means of a mechanism which constitutes the subject matter of a separate application for patent. It will be understood that, in the laying and anchoring of two or more plies according to my invention as herein set forth, the under ply is first completely laid and anchored, and the next succeeding and overlying ply is correspondingly completely laid and anchored.

Referring to the drawings, 1 designates a metallic bead ring, which is of annular or hoop shape conforming to the annulus of the tire and constitutes the base element of the anchor construction. The bead ring is preferably formed of wire of suitable diameter and of solid cross-section, and is adapted to carry bar or tangs or finger projecting laterally therefrom and upon which are mounted the anchoring eyelets, as hereinafter described.

In the preferred construction for connecting the bars or tangs with the bead ring 1, the latter is provided with a circumferential recess, 6, in its peripheral portion, which receives a corresponding lip or flange, 15, upon the bars or tangs, 2, whereby the bar or tang is locked in connection with the bead ring and securely retained against displacement when the tensioned cords are anchored by means of the eyelets hereinafter described. In the construction shown in Figs. 1 and 2, the bars or tangs 2 are separately formed of sheet metal, preferably sheet steel, stamped and bent to produce the desired shape, and comprise an eye or loop, 16, encircling the bead ring 1 and terminating in the lip or flange 15 which engages the recess 6, said lip being at an acute angle to the eye or loop 16. The eye or loop 16 thus constitutes the body of the bar or tang by which it is secured to and mounted upon the bead ring 1 and from said body the stem of the bar or tang projects outwardly and extends laterally with relation to the bead ring. Said laterally-projecting stem portion is reduced in width with relation to the body eye or loop 16, whereby slots, as at 3, are formed between the stems of the respective bars or tangs when the separate bars or tangs are mounted in the complete series extending around the circumference of the bead ring. In the arrangement of the separate bars or tangs in series, the bars or tangs are placed closely together side by side with their body eyes or loops 16 encircling the bead ring and abutting, as shown in Fig. 2.

The bead ring and tangs thus serve as an inextensible anchor base for the looped edges of the cord body fabric which are secured in connection with said anchor base by the intermediate anchoring eyelets to which the bead-edge loops of the length of laid cord constituting the cord body fabric are directly connected.

The slots 3 which are formed intermediate of the separate tangs 2 are open at their outer ends, and in this construction the anchoring eyelets are inserted over the outer end of the respective tangs and are brought thereon longitudinally to proper position.

4 designates the anchoring eyelets, which are of metal and may be preferably formed of suitable bent wire. In contour, the eyelet comprises a main portion or eye which straddles or bridges the tang and is of a curvature or shape conforming to the cross-section of the cord, and from said eye or body portion extend securing stems, as at 5, which are received in the slots between the tangs and project under the latter.

From the foregoing, it will be understood that when the length of cord is laid with the looped ends resting upon the tangs, and the eyelets are engaged with the loops and inserted upon the tangs, the relative positions are such that the tangs project laterally with respect to the annulus of the tire, the eyelets are in position approximately parallel to the annulus of the tire, and the bead-edge loops of the length of cord are at an angle to the annulus of the tire and parallel to the tangs.

In Fig. 2 I have illustrated the relative position of the anchoring eyelets for two layers of cord fabric, the eyelets being arranged in a respective inner and outer series in which each eyelet straddles or bridges a bar or tang and overlaps the edge of the next adjoining eyelet, they being thus set in the close relationship required for the laying of the cord body fabric in the improved manner herein referred to and as set forth in my co-pending application hereinbefore noted. In this position, the anchoring eyelets are at a slightly oblique angle to the longitudinal plane of the tang, but the series of eyelets is parallel to the annulus of the tire and the looped ends of the cord are retained by the eyelets at approximately right angles to the annulus of the tire and substantially in line with the laterally-projecting tangs. The eye or body portion of the eyelet passes through the loop of the cord and securely binds or retains the same between the tang and eyelet-eye, as shown in Fig. 3, the length of cord, 7, passing under and through the eyelet and laying over itself at the loop, 8, from which it spreads or diverges in a gradual and continuous positional relationship so that the under portion of the length of the cord gradually emerges from beneath the upper portion thereof and said under and upper portions relatively spread and extend over the progressive variable circumference of the tire in the laid position as set forth in my co-pending application above noted. As shown in Fig. 3, the eyelet-eye has a contour conforming to the cross-section of the cord (which contour may be curved when a cord of curved cross-section is employed, as herein shown, or may be angular when a cord of flattened cross-section is employed), and in the preferred construction as herein shown the eyelet has its retaining stems 5—5 respectively turned outwardly in opposite directions, as at 9, so that they respectively engage under the adjoining tangs at opposite sides of the tang which is straddled or bridged by the eyelet, but it will be understood that the eyelet stems may be turned in any other suitable or adapted manner to effectively engage under the tangs for the secure retention of the eyelet in connection therewith.

It will be noted that in the construction as shown in Figs. 1 and 5 the outer edge of the stem of the tangs 2 is preferably turned downwardly, as at 12, which not only provides a reinforcing or strengthening edge resistant to strains but also provides a stop against the eyelets when the latter are positioned to retain the tensioned cords.

In Figs. 4 and 12 I have illustrated a modified construction in which the outer ends of the bars or tangs are provided with a transverse groove or cup, as at 10, in their upper face, formed by bending or otherwise, which groove of the series of separate tangs receives a reinforcing ring or hoop, 11, preferably formed of wire, whereby the tangs are securely held against any tendency to bend upwardly under strain or under tension of the cords. This outer reinforcing ring 11 is placed over the series of tangs, by springing or otherwise, after the cords are completely laid up in the manner shown in Fig. 3, and serves additionally as a stop against the eyelets when the latter are positioned to retain the tensioned cords.

In Figs. 5, 6, and 7, I have illustrated a modified construction of the bars or tangs, in which the latter, in lieu of being formed of sheet metal, are formed of wire bent to the required shape. The general structural features in this employment of bent-wire tangs is substantially the same as that shown in Figs. 1, 2, and 3, the wire forming the tang being bent to produce two parallel body eyes or loops 16—16 having terminal bent ends forming the retaining lips 15—15, and an approximately U-shaped projecting stem portion of narrower or reduced width with relation to the body portion which is formed by the two wire eyes or loops 16—16. The bent-wire tang as just described is preferably formed by bending a continuous length of wire, starting from one retaining end 15 and forming one of the body eyes or loops 16 and from thence forming the approximately U-shaped stem portion of the tang and then forming the other body eye or loop 16 and the terminal retaining end 15 thereof, as shown in Figs. 6 and 7.

The outer reinforcing ring construction as illustrated in Fig. 4 may also be employed in relation to the tangs formed of bent wire as just described, under the construction as illustrated in Figs. 8 and 13, in which the outer end of the stem portion of the wire tang is bent to produce the transverse groove or cup 10 which receives the reinforcing ring or hoop 11 in the same manner as that described with reference to the construction shown in Figs. 4 and 12.

In the modified construction as shown in Figs. 9, 10, and 11, the slots 3 which are intermediate of the bars are not formed with the open outer end as in the construction shown in Figs. 2 and 6, but said slots, 3, are of T-shaped contour. This construction is more especially adapted for conditions in which the bars are not separately formed but are constructed integrally in series, as shown, and the T slots are formed by perforations provided in series in the sheet or member which forms the laterally-projecting bar structure, the head of the T being adjacent the outer edge of the latter. This construction thus provides a continuous reinforcing flange, as at 14, following the annulus of the bead ring, at the outer ends of the bars, 2, with which the reinforcing eyelets are engaged, said outer ring flange thus bracing the bars in their resistance to strains. To facilitate the insertion of the reinforcing eyelets upon the bars, under the construction just described, the outer reinforcing ring flange 14 is preferably turned downwardly at an angle to the plane of the bars 2, said downward turn commencing at a point just back of the cross-head of the T-slot, as shown in Fig. 10, whereby the cross-head of the T-slot is at an angle to the longitudinal main portion of the slot and forms an opening at the front thereof through which the reinforcing eyelets may be readily inserted and placed over the bar in the same manner as is followed and permitted under the construction shown in Fig. 2. The angular bend or turn of the ring flange 14 also serves to brace the same in its reinforcing office, as will be readily understood.

When the bars are constructed in integral series, for instance, as shown in Fig. 9, and formed of sheet metal, a modified construction may be employed in which the rear or inner edge of the bar-sheet is turned to form an eye or loop, 16, extending reversely to the construction of the eye or loop 16 as shown in Fig. 1 and omitting the terminal securing lip 15 thereof. This modified form of eye or lip may be crimped over a wire ring or hoop, 1, corresponding to the bead ring 1 of the construction shown in Fig. 1, in which circumstances said wire ring 1 is not grooved and is of relatively small diameter, and the bar-sheet with its body eye or loop 16 itself constitutes the bead ring, the wire ring 1 upon which it is crimped serving chiefly as a reinforce. The construction just described is illustrated in Figs. 9 and 10. As a further modification, the wire ring 1 may be omitted and the rear or inner edge of the bar-sheet may be rolled or turned at a suitable angle to the bar portion, to produce the body portion 16 by which the bar-sheet will be braced and reinforced, under which circumstances the bar-sheet itself constitutes the bead ring member.

Under some preferred conditions of construction, the bead ring 1, as shown in Figs. 1 and 5, may have a flexible character, in lieu of being formed of a wire of solid cross-section; for instance, it may be constituted by a metallic or textile cable, or of twisted wire or textile material, or a combination of both metallic and textile material. When such a flexible bead ring 1 is employed, the construction embodying the outer reinforcing ring 11, as shown in Figs. 4 and 12 and 8 and 13, is also preferably employed in conjunction therewith to afford the desired bracing and reinforcing of the anchoring structure.

It will also be understood that, in lieu of forming the bars or tangs separately, as in Figs. 2 and 6, the bars or tangs may be formed in connected series, in the desired number or plurality. Under these circumstances, the bar or tang construction as shown in Fig. 2 would be constituted by a sheet metal plate (similar to the illustration in Fig. 9), the laterally-projecting portion of which is cut or slotted to produce the slots 3 intermediate of the projecting bars or tangs; and in the bent-wire construction shown in Fig. 6 the length of wire would be bent continuously to produce the plurality of connected bars or tangs.

It will also be understood that the T-shaped slot construction, as shown in Fig. 9, can also be employed in connection with the outer reinforcing ring construction as shown in Figs. 4 and 8, by turning the end of the terminal flange 14 thereof to produce the groove or cup 10 for receiving the reinforcing ring 11, and also that the T-shaped slot construction can be produced with the arrangement of separate bars or tangs in series in lieu of the connected bars formed by the sheet metal plate as in Fig. 9.

Under the various constructions as herein shown, it will be noted that the separate bars or tangs are connected with the bead ring 1 and carried thereby in a laterally-projecting position, or that when the bars or tangs are themselves connected integrally in series the bar or tang-forming member may be connected with the bead ring or a reinforcing ring or said rings may be omitted and the bar or tang member itself will constitute the bead ring. The various constructions as set forth each afford the requisite conditions of strength in the anchoring of the cords in a connected relation to the anchor base constituted by the bead-ring member.

In Fig. 14 I have illustrated the bead portion of a completed tire, showing the embedded position of my improved anchoring means and the looped cords at the selvage edge of the cord body fabric after the cords have been laid in the manner hereinbefore set forth and anchored in relation to the bead ring and the anchored structure incorporated in the tire shoe or casing before the vulcanizing process.

The advantages of my invention and the operation of laying the cord fabric and anchoring the loops of the cords at the selvage edge thereof will be readily understood by those skilled in the art to which my improvements appertain. In the improved construction the cords are laced through the anchoring eyelets, with their loops passing through the eyes thereof at an angle to the annulus of the tire and in line with the bars or tangs of the bead ring which are also at an angle to the annulus of the tire, the reinforcing eyelets being intermediate of the bars or tangs and cords and approximately parallel to the annulus of the tire and thus substantially at right angles to the loop at which the cord lays over itself and to the bars or tangs which project laterally from the bead ring.

I do not desire to be understood as limiting myself to the detail construction and arrangement of parts as herein shown and described, as it is manifest that variations and modifications therein may be resorted to, in the adaptation of my invention to varying conditions of use, without departing from the spirit and scope of my invention and improvements. I therefore reserve the right to all such variations and modifications as properly fall within the scope of my invention and the terms of the following claims.

Having thus described my invention, I claim and desire to secure by Letters Patent:

1. In anchoring means for the cord body fabric of tires of the "cord" type, a bead ring member in line with the annulus of the tire, bar members respectively connected with said bead ring member and comprising a securing portion engaging the bead ring member and a bar portion projecting laterally therefrom at an angle to the annulus of the tire, eyelet members connected with said bars and positioned approximately parallel to the annulus of the tire, and the length of cord turned or looped under the eyelets and laid over itself at said loop at an angle to the annulus of the tire.

2. In anchoring means for the cord body fabric of tires of the "cord" type, the combination, with a bead ring member in line with the annulus of the tire, and bar members respectively connected with said bead ring member and comprising a securing portion engaging the bead ring member and a bar portion projecting laterally therefrom and having its outer edge turned or bent from the plane of its main portion, of eyelet members connected with said bars, and the length of cord turned or looped under the eyelets, said eyelet members constituting an intermediate anchorage between the cord loops and the bar members which are secured in connection with the bead ring member.

3. In anchoring means for the cord body fabric of tires of the "cord" type, the combination, with a bead ring member in line with the annulus of the tire, and bar members respectively connected with said bead ring member and comprising a securing portion engaging the bead ring member and a bar portion projecting laterally therefrom, said bar members being mounted in successive series upon the bead ring member and their bar portion being of less width than their securing portion, whereby the bar portions are separated by intervening slots or spaces, of eyelet members connected with said bars, and the length of cord turned or looped under the eyelets, said eyelet members constituting an intermediate anchorage between the cord loops and the bar members which are secured in connection with the bead ring member.

4. In anchoring means for the cord body fabric of tires of the "cord" type, the combination, with a bead ring member in line with the annulus of the tire, and bar members respectively connected with said bead ring member and comprising a securing portion engaging the bead ring member and a bar portion projecting laterally therefrom, said bar members being mounted in successive series upon the bead ring member and their bar portion being of less width than their securing portion, whereby the bar portions are separated by intervening slots or spaces, of eyelet members connected with and straddling or bridging over the bars, and the length of cord turned or looped through the eye of the eyelet, said eyelet members constituting an intermediate anchorage between the cord loops and the bar members which are secured in connection with the bead ring member.

5. In anchoring means for the cord body fabric of tires of the "cord" type, the combination, with a bead ring member in line with the annulus of the tire, and bar members respectively connected with said bead ring member and comprising a securing portion engaging the bead ring member and a bar portion projecting laterally therefrom, said bar members being mounted in successive series upon the bead ring member and their bar portion being of less width than their securing portion, whereby the bar portions are separated by intervening slots or spaces, of eyelet members connected with and straddling or bridging over the bars and having retaining portions passing through said slots or spaces and engaging under the bars, and the length of cord turned or looped through the eye of the eyelet, said eyelet members constituting an intermediate anchorage between the cord loops and the bar members which are secured in connection with the bead ring member.

6. In anchoring means for the cord body fabric of tires of the "cord" type, the combination, with a bead ring member in line with the annulus of the tire and provided with a surface recess, and a bar member connected with said bead ring member and comprising a body-eye or loop embracing the bead ring member and having a lip or flange engaging said recess therein and a bar portion projecting laterally from said body-eye or loop, of an eyelet member connected with said bar portion, and the length of cord turned or looped under the eyelet, said eyelet member constituting an intermediate anchorage between the cord loop and the bar member which is secured in connection with the bead ring member.

7. In anchoring means for the cord body fabric of tires of the "cord" type, the combination, with a bead ring member in line with the annulus of the tire, and a bar member connected with said bead ring member and comprising a securing body portion engaging the bead ring member and a bar portion projecting laterally therefrom, of an eyelet member connected with said bar portion, and the length of cord turned or looped under the eyelet, said eyelet member constituting an intermediate anchorage between the cord loop and the bar member which is secured in connection with the bead ring member.

8. In anchoring means for the cord body fabric of tires of the "cord" type, an anchor base comprising a bead ring member in line with the annulus of the tire and provided with a surface recess, and a bar member connected with said bead ring member and comprising a body-eye or loop embracing the bead ring member and having a lip or flange engaging said recess therein and a bar portion projecting laterally from said body-eye or loop.

9. In anchoring means for the cord body fabric of tires of the "cord" type, an anchor base comprising a bead ring member in line with the annulus of the tire, and a bar member connected with said bead ring member and comprising a securing body portion engaging the bead ring member and a bar portion projecting laterally from said securing body portion and beyond the plane thereof.

10. In anchoring means for the cord body fabric of tires of the "cord" type, an anchor base comprising a bead ring member in line with the annulus of the tire, and a bar member constituted by a length of wire bent to form a securing body portion engaging the bead ring member and a bar portion projecting laterally from said securing body portion and beyond the plane thereof.

11. In anchoring means for the cord body fabric of tires of the "cord" type, an anchor base comprising a bead ring member in line with the annulus of the tire and provided with a surface recess, and a bar member constituted by a length of wire bent to form a body-eye or loop embracing the bead ring member and having a lip or flange engaging said recess therein and a bar portion projecting laterally from said body-eye or loop.

12. In anchoring means for the cord body fabric of tires of the "cord" type, an anchor base comprising a bead ring member in line with the annulus of the tire, and a bar member constituted by a length of wire bent at its respective terminal ends to form a body-eye or loop engaging the bead ring member and at its central portion to form an approximately U-shaped projecting stem of narrower or reduced width with relation to the securing portion formed by said terminal eyes or loops and projecting laterally from said securing portion.

13. In anchoring means for the cord body fabric of tires of the "cord" type, a bar member comprising a body portion and a bar portion projecting laterally therefrom, said body portion being enlarged or extended beyond the plane of the bar portion to form a reinforce or anchoring base therefor, eyelet members connected with said bar portion, and the length of cord turned or looped under the eyelets, said eyelet members constituting an intermediate anchorage between the cord loops and the bar member.

14. In anchoring means for the cord body fabric of tires of the "cord" type, a bar member comprising a body portion and a bar portion projecting laterally therefrom, said body portion being enlarged or extended beyond the plane of the bar portion to form a reinforce or anchoring base therefor and the bar portion having its outer edge turned or bent from the plane of its main portion, eyelet members connected with said bar portion, and the length of cord turned or looped under the eyelets, said eyelet members constituting an intermediate anchorage between the cord loops and the bar member.

15. In anchoring means for the cord body fabric of tires of the "cord" type, an anchor base comprising a bead ring member in line with the annulus of the tire and bar members projecting laterally from the bead ring at an angle to the annulus of the tire and having a transverse groove or recess in the upper face at their outer ends, and an outer reinforcing ring member extending over the outer ends of the series of projecting bars and seated in said recesses.

16. In anchoring means for the cord body fabric of tires of the "cord" type, an anchor base comprising a bead ring member in line with the annulus of the tire and bar members projecting laterally from the bead ring at an angle to the annulus of the tire, and outer reinforcing means connecting the outer ends of the series of projecting bars.

17. In anchoring means for the cord body fabric of tires of the "cord" type, an anchor base comprising bar members in series in line with the annulus of the tire and having a transverse groove or recess in the upper face at their outer ends, and an outer reinforcing ring member extending over the outer ends of the series of projecting bars and seated in said recesses.

18. In anchoring means for the cord body fabric of tires of the "cord" type, an anchor base comprising bar members in series in line with the annulus of the tire and projecting laterally at an angle to the annulus of the tire, and outer reinforcing means connecting the outer ends of the series of projecting bars.

In testimony whereof I have signed the foregoing specification.

FREDRICK S. DICKINSON.